May 21, 1957 H. FLEISHER 2,793,303

PULSE SHARPENING CIRCUITS

Filed Dec. 21, 1951

INVENTOR
HAROLD FLEISHER
BY Joseph C. Sweet, Jr.
ATTORNEY

United States Patent Office 2,793,303
Patented May 21, 1957

2,793,303

PULSE SHARPENING CIRCUITS

Harold Fleisher, Poughkeepsie, N. Y., assignor to International Business Machines Corporation, New York, N. Y., a corporation of New York Application December 21, 1951, Serial No. 262,857

6 Claims. (Cl. 307—88.5)

Figure 1:
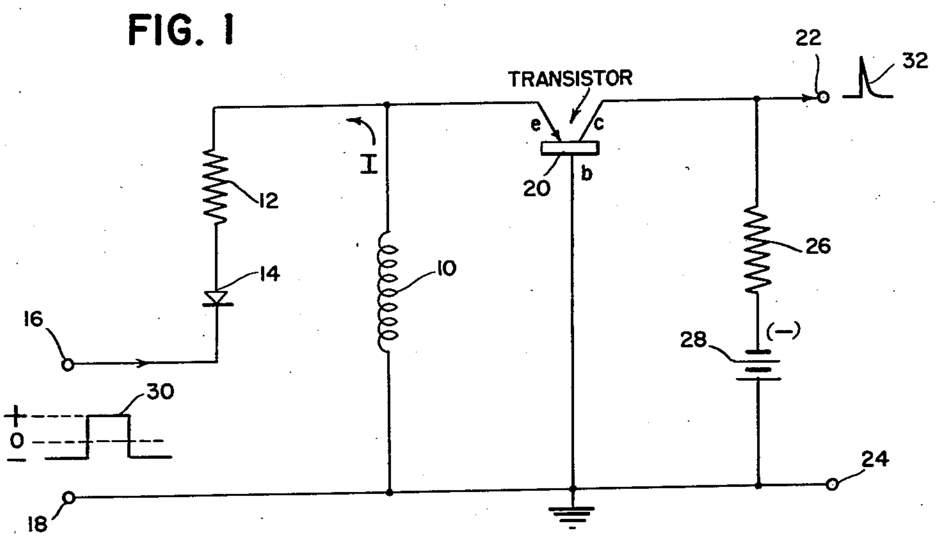

This invention relates to pulse sharpening circuits and more particularly to pulse sharpening circuits employing transistors.

The transistor was initially described in an article by Bardeen and Brattain in Physical Review, vol. 74, pp. 230–231, July 15, 1948. It has since been described in greater detail in an article by the same authors in Physical Review, vol. 75, pp. 1208–1225, April 15, 1949.

Since that time various forms of transistor have been produced, including the coaxial transistor, the junction transistor and the fieldistor.

These are described in the following articles:

Koch and Wallace "Coaxial transistors," Electrical Engineering, vol. 68, pp. 222–223, March 1949;

Shockley et al., "p-n Junction transistors," Physical Review, vol. 83, pp. 151–162, July 1, 1951;

Stuetzer, "A crystal amplifier with high input impedance," Proceedings of the I. R. E., vol. 38, pp. 868–871, August 1950.

Briefly, the basic transistor comprises a small block of semi-conductor material to which are applied at least three electrodes, termed base, collector, and emitter, respectively. The semi-conductor material may be of either n-type (indicating that the charges in the material normally available for carrying current are negative, i. e., electrons) or p-type (indicating that the charges in the material normally available for carrying current are positive, i. e., "holes"). It has been found that silicon and germanium, and particularly the latter, are suitable semi-conductor materials. In the original point contact, or "Type A" transistor, and the fieldistor the body block is composed of only one type of semi-conductor material before surface treatment, and in the case of germanium the type usually employed is n-type. In the case of the junction transistor, the body block is composed of three or more layers of alternately n- and p-type semi-conductor material (usually germanium) and the contacts are of the ohmic type, rather than being point contacts. When potentials are properly applied between the base and each of the other two electrodes, a translating device is produced wherein variations in current in the collector-base or output circuit are produced by variations in current in the emitter-base or input circuit.

The theory and operation of the transistor are described in detail in the above articles.

In many applications it is desirable or necessary either to shorten or sharpen a pulse. For example, many times it is desirable to determine the sequence of occurrence of several overlapping pulses. The sharper the pulses are, the more easily they can be separated. Known circuits for achieving pulse sharpening, such as the resistance-capacitance differentiating circuit, have certain disadvantages, as is well known in the art, including the fact that they cannot carry direct components of current and the fact that there is marked attenuation of the input pulse during the differentiation thereof. The latter is particularly important when, in order to obtain extremely sharp pulses, the differentiation process is to be repeated one or more times.

Accordingly, the principal feature of this invention is the provision of an improved pulse sharpening circuit which provides an extremely sharp pulse in response to each input pulse and which utilizes a translating device in the form of a transistor having its input connected in parallel with an inductance through which current normally flows, this current being interrupted during the application of each input pulse to the circuit.

Other features of this invention will be pointed out in the following description and claims and illustrated in the accompanying drawings which disclose, by way of example, the principle of this invention and the best mode which has been contemplated of applying that principle.

Figure 2:
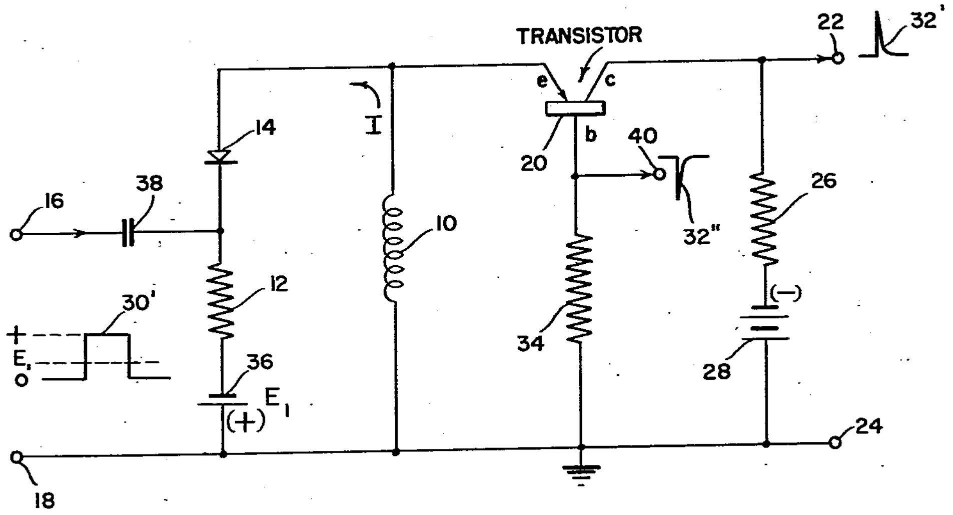

In the drawings:

Fig. 1 shows one embodiment of a pulse sharpening circuit in accordance with this invention; and, Fig. 2 shows an alternative embodiment.

Briefly, in accordance with this invention an inductance is biased so as to cause a current to flow normally therethrough and arranged so that this current is interrupted for the duration of each input pulse applied to the circuit. A back electromotive force is developed across the inductance during the interruption of this normal current flow and the inductance is connected across the input circuit of a translating device in the form of a transistor in such manner as to produce from the output thereof, in response to this back electromotive force, a sharpened pulse, which, if not amplified, at least is not attenuated. Whether or not amplification occurs is, of course, determined by the characteristics of the particular translating device or transistor utilized in the circuit.

As shown in Fig. 1 of the drawings, inductance 10 is serially connected with a current limiting impedance, in the form of resistor 12, and diode 14 between input terminals 16 and 18. Diode 14, which is substantially a uni-directional device, is poled in the circuit in such manner that a current I normally flows through inductance 10 in the direction indicated by the arrow whenever terminal 16 is negative with respect to terminal 18. Base *b* of translating device or transistor 20 is grounded and connected to input terminal 18 and the lower end of inductance 10. Emitter *e* of the transistor is connected to the junction of inductance 10 and resistor 12. Collector *c* of the transistor is connected to output terminal 22 and also through a load impedance, in the form of resistor 26, and bias battery 28, which are serially connected, to output terminal 24, which is also grounded. The input characteristic of transistor 20 is other than positive over at least a portion of its operating input characteristic, i. e., is either zero or negative, in order to produce a positive or regenerative feedback effect and enhance the sharpening of the output pulse produced.

As indicated by the wave form adjacent input terminals 16 and 18, terminal 16 is normally biased negatively with respect to terminal 18 by the input source such that the "no signal" D. C. level at the input is several volts below ground potential. This causes the current I to flow through inductance 10, current limiting resistor 12 and the forward low-resistance direction of diode 14. This negative voltage at terminal 16 also biases emitter *e* of transistor 20 negatively with respect to its base *b*, so that either no emitter current will flow through the transistor or its flow will be in the negative direction, thus insuring that no "holes" will be injected and hence minimum current will flow in the collector circuit. When a pulse 30 is applied through terminal 16 to the cathode of diode 14 of sufficient amplitude to raise the potential of the diode-cathode several volts above ground as indicated, diode 14 will be forced into the high resistance region of its characteristic, thus acting as a switch and presenting a high impedance to the input source. The normal current I flowing through inductance 10 is thus interrupted for the duration of input pulse 30, causing inductance 10 to develop a back electromotive force which is positive at its upper end and thus of the proper polarity to drive current through the input emitter-base circuit of transistor 20. Thus the effective "discharge" time constant for the inductance is $L/R_e$ where L is the value of inductance 10 in henries and $R_e$ is the effective forward-direction emitter resistance of transistor 20 in ohms. For typical values, e. g., $L=1$ mh. and $R_e \simeq 100\Omega$, this "discharge" time constant is thus of the order of 10 $\mu$sec. The average current through the emitter during the discharge time is of the order of ⅔ I, when the discharge time is defined as the time interval required for the current to be discharged to $1/\epsilon$ of its original value.

Typical circuit values for the embodiment of Fig. 1 are resistor 12=1,000 ohms, resistor 26=10,000 ohms, diode 14=Type 1N34, bias battery 28=22.5 volts, transistor 20="Type A" using *n*-type germanium with $\alpha=2$, and presenting a negative input impedance over a portion of its operating range, and inductance 10=1 mh. and having a high Q. In other words, the resistance of inductance 10 should be small compared with the effective forward-direction emitter resistance of transistor 20. This means that $R_L$, the resistance of the inductance, should be equal to or less than one-tenth $R_e$, and since a typical value of $R_e$ is of the order of 100 ohms, $R_L$ should be not more than approximately 10 ohms.

As pointed out above the voltage amplification of the sharpened output pulse 32 will depend upon the collector circuit of the transistor and its amplification factor $\alpha$. Alpha should be at least 1.5 and preferably 2. With the above circuit and a transistor having $\alpha=2$, an input pulse 30 of 5–6 volts magnitude produced a sharpened output pulse 32 of 30–40 volts magnitude.

While transistor 20 may inherently present a negative or zero input impedance (volt-ampere) over a portion of its operating range in order to enhance the sharpening of the output pulse as pointed out above, it should be noted that a sharpening action is produced by the circuit of Fig. 1 even if transistor 20 presents a positive input impedance, i. e., the input pulse is still sharpened somewhat due to the differentiating action of the circuit.

It is also to be noted that the transistor circuit may present a negative or zero impedance over a portion of its operating range even though the transistor itself does not present such a characteristic. Such a circuit is shown in the alternative embodiment of Fig. 2, wherein the addition of a base impedance, in the form of resistor 34 connected between base *b* of transistor 20 and ground, produces a transistor circuit with the desired negative input impedance over a portion of its operating range even though the transistor 20 inherently presents a positive input impedance. Corresponding circuit elements in the two figures are correspondingly numbered, and the circuit of Fig. 2 further differs from the circuit of Fig. 1 in that diode 14, current limiting resistor 12 and a second bias battery 36 are connected in series in the order named, and this series combination is then connected in parallel with inductance 10 as shown. Further, the positive terminal of battery 36 is grounded and connected to input terminal 18 and the lower terminal of inductance 10. Also, input terminal 16 is connected through coupling condenser 38 to the junction of diode 14 and resistor 12, diode 14 being poled relative to inductance 10 in the same direction as in Fig. 1. The remainder of the circuit of Fig. 2 is the same as that shown in Fig. 1, and its operation is similar. Bias battery 36 produces a potential $E_1$ of the order of several volts and causes the current I to flow normally through inductance 10 in the manner described above in connection with the operation of the circuit of Fig. 1. A positive input pulse 30′ of the same magnitude as input pulse 30 of Fig. 1 is applied to terminal 16 to interrupt the current I through inductance 10 in the manner described above. The D. C. level at input terminal 16 is unimportant since coupling condenser 38 will pass only the A. C. component of the input. As indicated in Fig. 2 the magnitude of input pulse 30′ is large enough to overcome the bias $E_1$ in order to cause diode 14 to function as a switch. A second output is available at terminal 40, connected to the junction of base *b* and base resistor 34, since the latter also functions as a load impedance. This second output waveform 32″ is similar to the output waveform 32′ available at line 22, but is of opposite polarity.

While the circuits of Figs. 1 and 2 in their preferred form have been indicated as utilizing translating devices in the form of "Type A" transistors with n-type germanium, transistors using p-type germanium may be utilized merely by changing the polarities of the batteries and the input pulse, resulting in output pulses of opposite polarity from those shown in the drawing. Also, if desired, the newer type transistors may be utilized.

While there have been shown and described and pointed out the fundamental novel features of the invention as applied to preferred embodiments, it will be understood that various omissions and substitutions and changes in the form and details of the device illustrated and in its operation may be made by those skilled in the art, without departing from the spirit of the invention. For example, the base impedance 34 may be utilized in the circuit of Fig. 1, and may, if desired, be omitted from the circuit of Fig. 2. Similarly, each of the circuits of Figs. 1 and 2 may utilize a transistor presenting a negative or zero input impedance over a portion of its operating range or not, as desired, depending upon whether the base impedance is utilized or not and the degree of sharpening desired. Load impedance 26 may, of course, also be omitted if not needed. It is the intention, therefore, to be limited only as indicated by the scope of the following claims.

What is claimed is:

1. A pulse sharpening circuit consisting of a rectifier and an inductance serially connected and biased to be normally conducting; means for applying input pulses to said rectifier to interrupt the current normally flowing therethrough; a transistor having emitter, collector and base electrodes with its emitter electrode connected to one terminal of said inductance and its base electrode connected to the other terminal thereof to bias said transistor to be substantially non-conducting; and a load impedance and a source of potential serially connected between said collector and base electrodes, whereby said transistor conducts and quenches the current which flows through said inductance due to the back electromotive force developed across said inductance upon application of an input pulse and thereby produces a sharpened pulse across said load impedance.

2. A pulse sharpening circuit consisting of a rectifier, a current limiting impedance and an inductance serially connected and biased to be normally conducting; means for applying input pulses to said rectifier to interrupt the current normally flowing therethrough; a transistor having emitter, collector and base electrodes with its emitter electrode connected to one terminal of said inductance and its base electrode connected to the other terminal thereof to bias said transistor to be substantially non-conducting; and a load impedance and a source of potential serially connected between said collector and base electrodes, whereby said transistor conducts and quenches the current which flows through said inductance due to the back electromotive force developed across said inductance upon application of an input pulse and thereby produces a sharpened pulse across said load impedance.

3. A pulse sharpening circuit consisting of a rectifier, an inductance, a current limiting impedance, and bias means serially connected to be normally conducting; means for applying input pulses to said rectifier to interrupt the current normally flowing therethrough; a transistor having emitter, collector and base electrodes with its emitter electrode connected to one terminal of said inductance and its base electrode connected to the other terminal thereof to bias said transistor to be substantially non-conducting; and a load impedance and a source of potential serially connected between said collector and base electrodes, whereby said transistor conducts and quenches the current which flows through said inductance due to the back electromotive force developed across said inductance upon application of an input pulse and thereby produces a sharpened pulse across said load impedance.

4. A pulse sharpening circuit consisting of a rectifier and an inductance serially connected and biased to be normally conducting; means for applying input pulses to said rectifier to interrupt the current normally flowing therethrough; an impedance element; a current multiplication transistor having emitter, collector and base electrodes with its emitter electrode connected to one terminal of said inducance and its base electrode connected through said impedance element to the other terminal thereof to bias said transistor to be normally substantially non-conducting; and a source of potential for said collector electrode, whereby said transistor conducts and quenches the current which flows through said inductance due to the back electromotive force developed across said inductance upon application of an input pulse and thereby produces a sharpened pulse across said impedance element.

5. A pulse sharpening circuit consisting of a rectifier, a current limiting impedance and an inductance serially connected and biased to be normally conducting; means for applying input pulses to said rectifier to interrupt the current normally flowing therethrough; an impedance element; a transistor having emitter, collector and base electrodes with its emitter electrode connected to one terminal of said inductance and its base electrode connected through said impedance element to the other terminal thereof to bias said transistor to be normally substantially non-conducting; and a load impedance and a source of potential serially connected between said collector and the junction of said inductance and said impedance element, whereby said transistor conducts and quenches the current which flows through said inductance due to the back electromotive force developed across said inductance upon application of an input pulse and thereby produces a sharpened pulse across said impedance element and said load impedance.

6. A pulse sharpening circuit consisting of a rectifier, an inductance, a current limiting impedance, and bias means serially connected to be normally conducting; means for applying input pulses to said rectifier to interrupt the current normally flowing therethrough; an impedance element; a transistor having emitter, collector and base electrodes with its emitter electrode connected to one terminal of said inductance and its base electrode connected through said impedance element to the other terminal thereof to bias said transistor to be normally substantially non-conducting; and a load impedance and a source of potential serially connected between said collector and the junction of said inductance and said impedance element, whereby said transistor conducts and quenches the current which flows through said inductance due to the back electromotive force developed across said inductance upon application of an input pulse and thereby produces a sharpened pulse across said impedance element and said load impedance.

References Cited in the file of this patent

UNITED STATES PATENTS

| | | |
|---|---|---|
| 2,238,185 | Pare | Apr. 15, 1941 |
| 2,442,770 | Kenyon | June 8, 1948 |
| 2,443,619 | Hopper | June 22, 1948 |
| 2,621,289 | Gray | Dec. 9, 1952 |
| 2,585,078 | Barney | Feb. 12, 1952 |
| 2,629,833 | Trent | Feb. 24, 1953 |